(12) United States Patent
Dall'Armi et al.

(10) Patent No.: US 6,863,078 B1
(45) Date of Patent: Mar. 8, 2005

(54) FLUID TREATMENT SYSTEM AND CLEANING APPARATUS THEREFOR

(75) Inventors: Vivian Dall'Armi, London (CA); Gang Fang, North York (CA); Yuri Lawryshyn, Komoka (CA); Joseph Lem, London (CA); Douglas Penhale, London (CA)

(73) Assignee: Trojan Technologies, Inc. (CA)

( * ) Notice: Subject to any disclaimer, the term of this patent is extended or adjusted under 35 U.S.C. 154(b) by 0 days.

(21) Appl. No.: 09/744,682

(22) PCT Filed: May 26, 2000

(86) PCT No.: PCT/CA00/00617

§ 371 (c)(1),
(2), (4) Date: Jun. 26, 2001

(87) PCT Pub. No.: WO00/73213

PCT Pub. Date: Dec. 7, 2000

Related U.S. Application Data

(60) Provisional application No. 60/136,766, filed on May 28, 1999.

(51) Int. Cl.$^7$ ................................................. B08B 3/04
(52) U.S. Cl. ..................... 134/64 R; 134/170; 134/181; 134/122 R
(58) Field of Search ................................. 134/171, 170, 134/181, 201, 64 R, 122 R, 199, 196

(56) References Cited

U.S. PATENT DOCUMENTS 3,365,740 A * 1/1968 Hunt et al.
5,227,140 A * 7/1993 Hager et al.
5,295,278 A * 3/1994 Condon et al.
5,440,131 A * 8/1995 Hutchison et al.
5,501,843 A * 3/1996 Peterson
5,505,912 A * 4/1996 Hallett
5,590,390 A   12/1996 Maarschalkerweerd .. 422/186.3
5,874,740 A    2/1999 Ishiyama ..................... 250/431
5,937,266 A * 8/1999 Kadoya
6,231,820 B1 * 5/2001 Wedekamp
6,303,087 B1 * 10/2001 Wedekamp
6,315,963 B1 * 11/2001 Speer

FOREIGN PATENT DOCUMENTS

EP       0743105 A1   11/1996   ............. B08B/9/02
JP       55-129104   * 10/1980

* cited by examiner

Primary Examiner—Frankie L. Stinson
(74) Attorney, Agent, or Firm—Katten Muchin Zavis Rosenman

(57) ABSTRACT

A cleaning apparatus (10) for a radiation source assembly (35) in a fluid treatment system is described. The cleaning apparatus comprise cleaning chamber (20) and a second chamber (25, 30) independent of the cleaning chamber which defines a fluid (typically water) buffer layer to obviate or mitigate cleaning fluid from the cleaning chamber leaking into the fluid being treated. The fluid treatment system is particularly useful for us in clean water applications in which ultraviolet radiation is used to treat the water while having the advantages of in situ cleaning of the radiation source when it becomes fouled.

28 Claims, 8 Drawing Sheets

FLUID TREATMENT SYSTEM AND CLEANING APPARATUS THEREFOR

This application claims the benefit of Provisional application Ser. No. 60/136,766, filed May 28, 1999.

TECHNICAL FIELD

In one of its aspects, the present invention relates to a cleaning apparatus for use in a fluid treatment system. In another of its aspects, the present invention relates to a fluid treatment system comprising the cleaning apparatus.

BACKGROUND ART

Fluid treatment systems are known generally in the art.

For example, U.S. Pat. Nos. 4,482,809, 4,872,980 and 5,006,244 (all in the name of Maarschalkerweerd and all assigned to the assignee of the present invention and hereinafter referred to as the Maarschalkerweerd #1 Patents), the contents of each of which are hereby incorporated by reference, all describe gravity fed fluid treatment systems which employ ultraviolet (UV) radiation.

Such systems include an array of UV lamp frames which include several UV lamps each of which are mounted within sleeves which extend between and are supported by a pair of legs which are attached to a cross-piece. The so-supported sleeves (containing the UV lamps) are immersed into a fluid to be treated which is then irradiated as required. The amount of radiation to which the fluid is exposed is determined by the proximity of the fluid to the lamps, the output wattage of the lamps and the fluid's flow rate past the lamps. Typically, one or more UV sensors may be employed to monitor the UV output of the lamps and the fluid level is typically controlled, to some extent, downstream of the treatment device by means of level gates or the like.

However, disadvantages exist with the above-described systems. Depending upon the quality of the fluid which is being treated, the sleeves surrounding the UV lamps periodically become fouled with foreign materials, inhibiting their ability to transmit UV radiation to the fluid. For a given installation, the occurrence of such fouling may be determined from historical operating data or by measurements from the UV sensors. Once fouling has reached a certain point, the sleeves must be cleaned to remove the fouling materials and optimize system performance.

If the UV lamp modules are employed in an open, channel-like system (e.g., such as the one described and illustrated in Maarschalkerweerd #1 Patents), one or more of the modules may be removed while the system continues to operate, and the removed frames may be immersed in a bath of suitable cleaning solution (e.g., a mild acid) which may be air-agitated to remove fouling materials. Of course, this necessitates the provision of surplus or redundant sources of UV radiation (usually by including extra UV lamp modules) to ensure adequate irradiation of the fluid being treated while one or more of the frames has been removed for cleaning. This required surplus UV capacity adds to the capital expense of installing the treatment system. Further, a cleaning vessel for receiving the UV lamp modules must also be provided and maintained. Depending on the number of modules which must be serviced for cleaning at one time and the frequency at which they require cleaning, this can also significantly add to the expense of operating and maintaining the treatment system. Furthermore, this cleaning regimen necessitates relatively high labor costs to attend to the required removal/re-installation of modules and removal/re-filling of cleaning solution in the cleaning vessel. Still further, such handling of the modules results in an increased risk of damage to or breakage of the lamps in the module.

If the frames are in a closed system (e.g., such as the treatment chamber described in U.S. Pat. No. 5,504,335 (in the name of Maarschalkerweerd and assigned to the assignee of the present invention), the contents of which are hereby incorporated by reference), removal of the frames from the fluid for cleaning is usually impractical. In this case, the sleeves must be cleaned by suspending treatment of the fluid, shutting inlet and outlet valves to the treatment enclosure and filling the entire treatment enclosure with the cleaning solution and air-agitating the fluid to remove the fouling materials. Cleaning such closed systems suffers from the disadvantages that the treatment system must be stopped while cleaning proceeds and that a large quantity of cleaning solution must be employed to fill the treatment enclosure. An additional problem exists in that handling large quantities of cleaning fluid is hazardous and disposing of large quantities of used cleaning fluid is difficult and/or expensive. Of course open flow systems suffer from these two problems, albeit to a lesser degree.

Indeed, it is the belief of the present inventors that, once installed, one of the largest maintenance costs associated with prior art fluid treatment systems is often the cost of cleaning the sleeves about the radiation sources.

U.S. Pat. Nos. 5,418,370, 5,539,210 and 5,590,390 (all in the name of Maarschalkereerd and all assigned to the assignee of the present invention and hereinafter referred to as the Maarschalkerweerd #2 Patents), the contents of each of which are hereby incorporated by reference, all describe an improved cleaning system, particularly advantageous for use in gravity fed fluid treatment systems which employ UV radiation. Generally, the cleaning system comprises a cleaning sleeve engaging a portion of the exterior of a radiation source assembly including a radiation source (e.g., a UV lamp). The cleaning sleeve is movable between: (i) a retracted position wherein a first portion of radiation source assembly is exposed to a flow of fluid to be treated, and (ii) an extended position wherein the first portion of the radiation source assembly is completely or partially covered by the cleaning sleeve. The cleaning sleeve includes a chamber in contact with the first portion of the radiation source assembly. The chamber is supplied with a cleaning solution suitable for removing undesired materials from the first portion of the radiation source assembly.

The cleaning system described in the Maarschalkerweerd #2 Patents represents a significant advance in the art, especially when implemented in the radiation source module and fluid treatment system illustrated in these patents. More specifically, the cleaning system described in the Maarschalkerweerd #2 Patents is particularly useful in municipal wastewater treatment facilities in which the cleaning system is employed in combination with an ultraviolet radiation treatment system disposed an open channel comprising a gravity fed flow of fluid. After treatment, the fluid is then discharged into a stream, creek, river, lake or other body of water.

Clean water treatment systems present a unique set of challenges since the fluid being treated in the system is a source of potable/drinking water. If the cleaning system described in the Maarschalkerweerd #2 Patents were implemented in a clean water treatment system, there would be a significant likelihood of leakage of the cleaning solution from the chamber into the fluid being treated. It is desirable to avoid such leakage of cleaning solution from the cleaning system.

Thus, notwithstanding the advances in the art provided by the cleaning system taught in the Maarschalkerweerd #2 Patents, there remains a need in the art for a cleaning apparatus which may be implemented advantageously, inter alia, in a clean water treatment system.

DISCLOSURE OF THE INVENTION

It is an object of the invention to provide a cleaning apparatus which obviates or mitigates at least one of the above-mentioned disadvantages of the prior art.

Accordingly, in one of its aspects, the present invention provides a cleaning apparatus for use in a fluid treatment system comprising a radiation source assembly, the cleaning apparatus comprising:

- at least one cleaning sleeve in sliding engagement with the exterior of the radiation source assembly;
- a first chamber disposed in the at least one cleaning sleeve in contact with a portion of the exterior of the radiation source assembly and for being supplied with a cleaning solution;
- a second chamber disposed in the at least one cleaning sleeve adjacent the first chamber;
- seal means to restrict movement of fluid between the first chamber and the second chamber; and
- drive means to translate the at least one cleaning sleeve along the exterior of the radiation source assembly.

In another of its aspects, the present invention provides a fluid treatment device comprising a housing for receiving a flow of fluid, the housing comprising:

- a fluid inlet;
- a fluid outlet;
- a fluid treatment zone disposed between the fluid inlet and the fluid outlet;
- a radiation source assembly disposed in the fluid treatment zone for treatment of the flow of fluid; and
- a cleaning apparatus comprising: at least one cleaning sleeve in sliding engagement with the exterior of the radiation source assembly; a first chamber disposed in the at least one cleaning sleeve in contact with a portion of the exterior of the radiation source assembly and for being supplied with a cleaning solution; a second chamber disposed in the at least one cleaning sleeve adjacent the first chamber; seal means to prevent substantially unrestricted movement of fluid between the first chamber and the second chamber; first drain means to withdraw fluid from the second chamber; and drive means to translate the at least one cleaning sleeve along the exterior of the radiation source assembly.

Thus, the present inventors have developed a novel cleaning device for use in a fluid treatment system. The cleaning device contains two "independent" chambers. Specifically, there is provided a cleaning chamber for containing a cleaning solution in contact with an exterior of a radiation source assembly. A second chamber is provided in the cleaning sleeve substantially adjacent the first chamber. The second chamber, in essence, functions as a fluid (typically water) buffer layer between the cleaning chamber and the fluid being treated. Thus, the fluid buffer layer acts to receive small amounts of cleaning solution which may leak from the cleaning chamber thereby obviating or mitigating passage of the cleaning fluid to the fluid being treated.

The cleaning chamber and the chamber defining the fluid buffer layer are relatively "independent" of one another. This may be achieved by using a seal between the two chambers. Since even the highest quality seals are likely to allow some leakage of cleaning fluid, the fluid buffer layer in the second chamber adjacent the cleaning chamber acts to obviate or mitigate alternate leakage of the cleaning fluid into the fluid being treated. This renders the present cleaning system advantageous for use in a clean water application where the fluid being treated is, for example, potable water.

When implemented in a fluid treatment system for clean water applications, it is conventional to dispose the treatment system in a closed pipe containing a pressurized (e.g., 150 psig) flow of water. If the cleaning solution in the cleaning chamber and the fluid in the second chamber acting as the fluid buffer layer are maintained at a pressure lower than the pressure of the fluid flow through the fluid treatment system, there is, in essence, a pressure drop across the region of the fluid flow and the two chambers of the cleaning device. This pressure drop assists in obviating or mitigating leakage of fluid from the cleaning chamber through the second chamber to the fluid being treated.

In a preferred embodiment, the second chamber defining the fluid buffer layer further includes a drain to remove fluid from the second chamber. This further obviates or mitigates leakage of cleaning solution from the cleaning chamber through the second chamber to the fluid being treated.

In a father preferred embodiment, the cleaning chamber is provided with a supply and drain to add and remove cleaning solution to and from the cleaning chamber. In a further preferred embodiment, this supply and drain in the cleaning chamber is comprised in a recirculation system which allows for addition of cleaning solution, as required.

BRIEF DESCRIPTION OF THE DRAWINGS

Embodiments of the present invention will be described with reference to the accompanying drawings, in which.

BEST MODE FOR CARRYING OUT THE INVENTION

Figure 1:
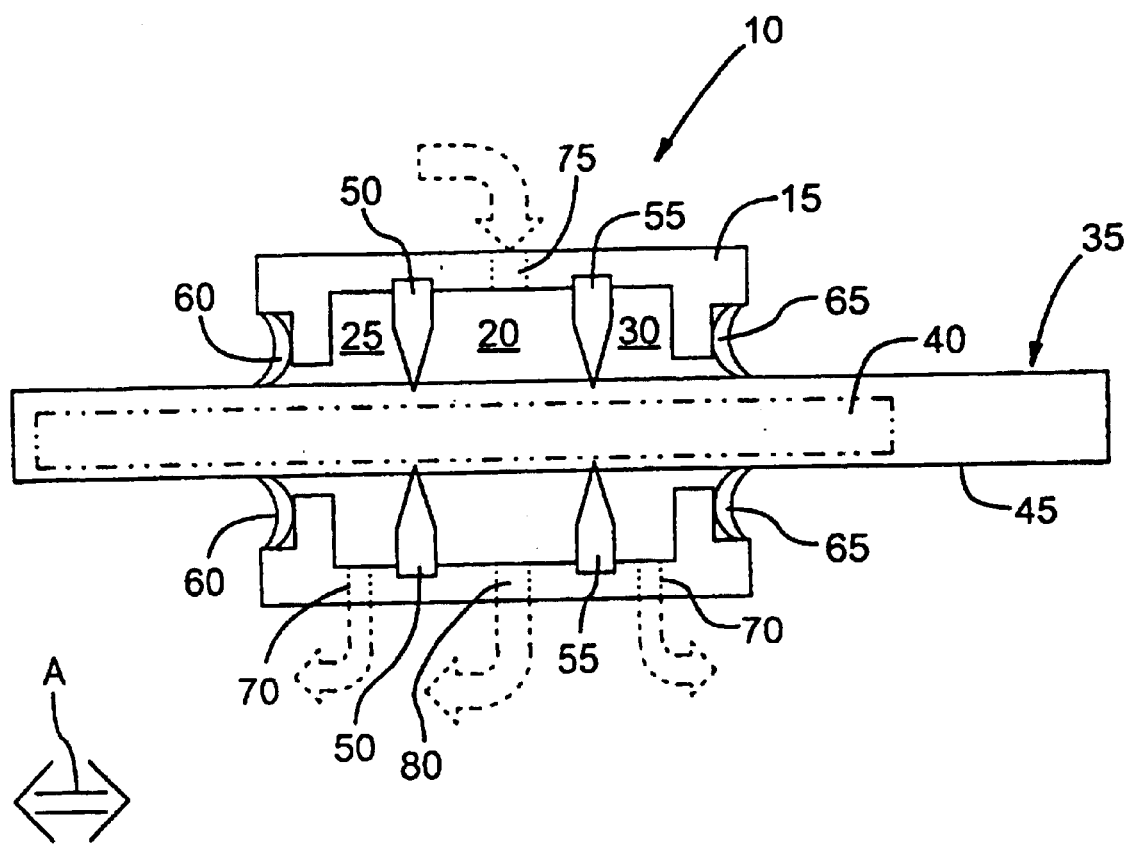
FIG. 1 illustrates a schematic, in cross-section, of a preferred embodiment of the present cleaning device.

With reference to FIG. 1, there is illustrated a cleaning apparatus 10. Cleaning apparatus 10 comprises a cleaning sleeve 15. Cleaning sleeve 15 comprises a cleaning chamber 20 and a pair of second chambers 25,30. Cleaning sleeve 15 is disposed over a radiation source assembly 35 comprising a radiation source 40 enclosed within a protective sleeve 45.

Cleaning chamber 20 is separated from second chambers 25,30 by a pair of seals 50,55.

Second chambers 25,30 are sealed from the exterior of the cleaning sleeve 15 by a pair of annular seals 60,65. Cleaning sleeve 15 is reversibly movable along the exterior of protective sleeve 45 in the direction of arrow A. The actuation of cleaning sleeve 15 along the exterior of protective sleeve 45 will be described in more detail hereinbelow.

Cleaning sleeve 15 further comprises a drain 70 from each of second chambers 25,30. Drain 70 may be utilized at atmospheric pressure. Ofcourse, the illustrated embodiment could be modified to have a single drain from one of second chambers 25,30, and by providing communication between second chambers 25,30. Further, a cleaning solution supply inlet 75 is provided in cleaning sleeve 15 and serves to allow for supply of cleaning solution to cleaning chamber 20. Also, a cleaning supply outlet 80 is provided to allow for withdrawal of cleaning solution from cleaning chamber 20.

Figure 2:
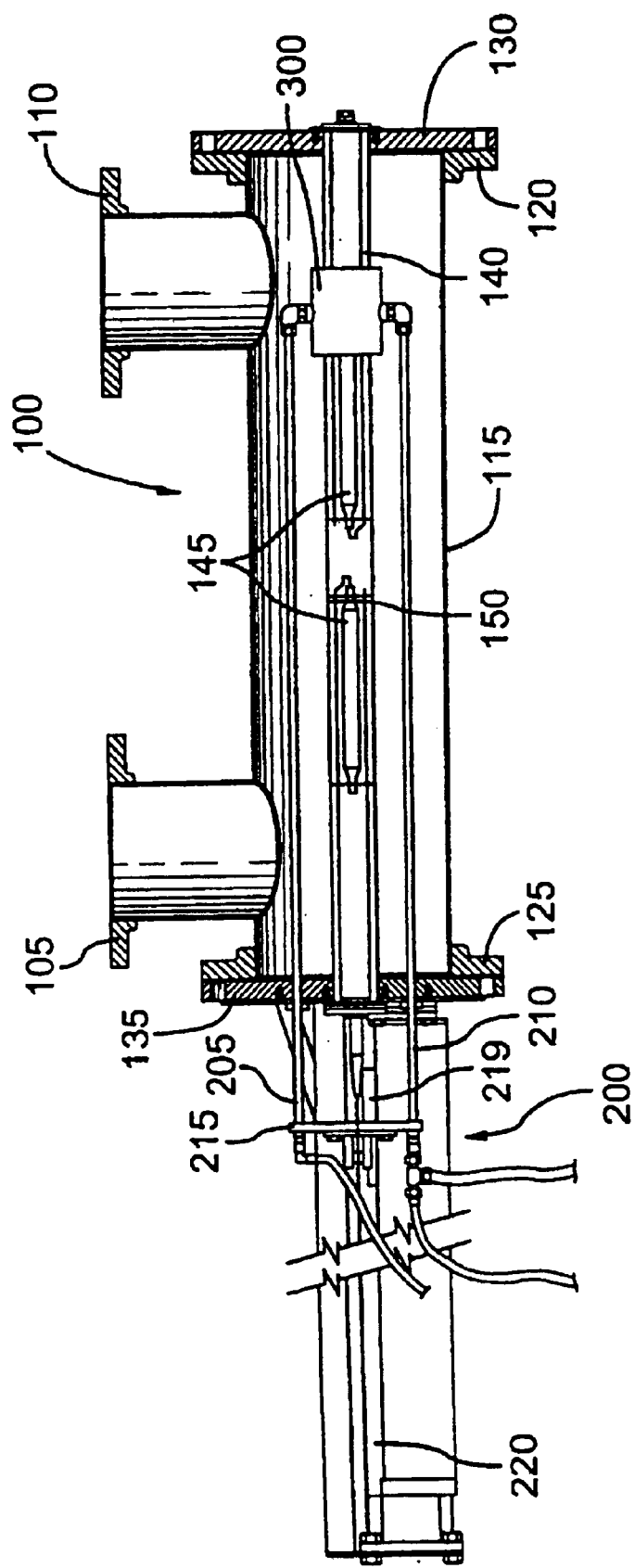
FIGS. 2 and 3 illustrate side elevations, in cross-section, of a preferred embodiment of a fluid treatment device comprising a preferred embodiment of the present cleaning apparatus.
Figure 3:
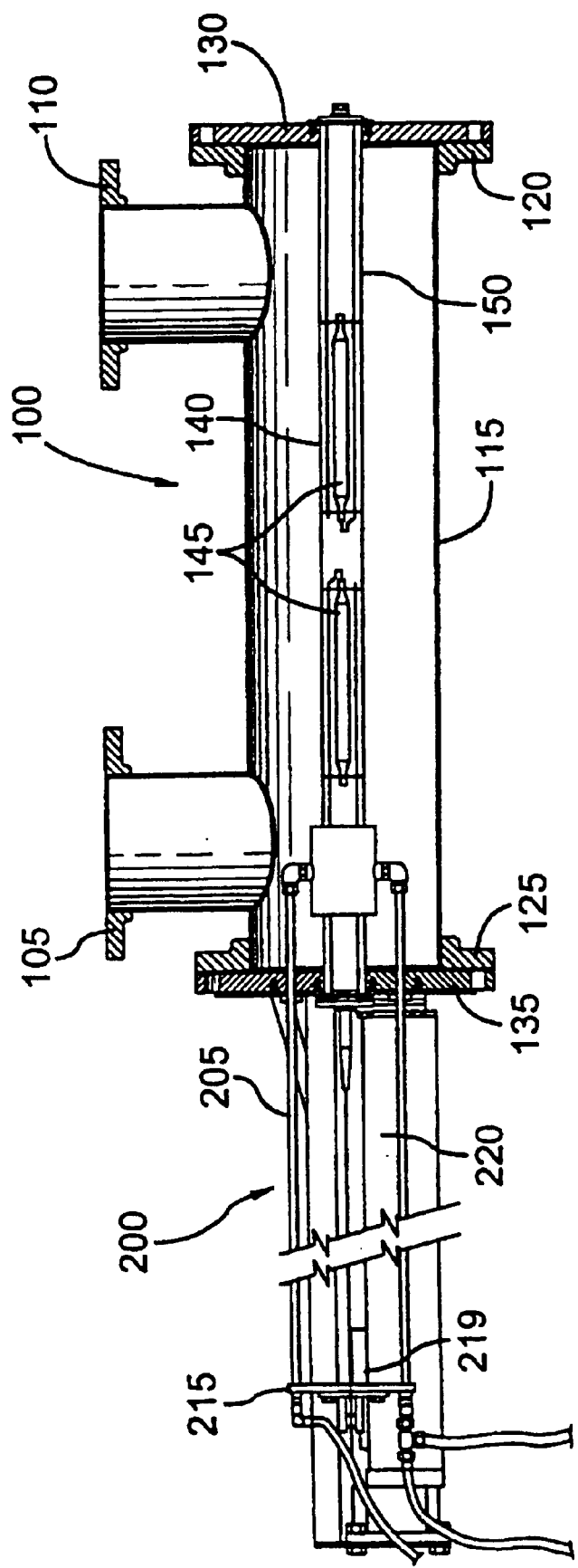

With reference to FIGS. 2 and 3, there is illustrated a fluid treatment device 100 comprising an inlet 105, an outlet 110 and a housing 115. A pair of opposed flanges 120,125 are disposed at opposite ends of housing 115. A pair of opposed cover plates 130,135 are attached to flanges 120,125, respectively, to provide, in the case of treating liquids, a fluid-tight seal.

Disposed in housing 115 is a radiation source assembly 140 comprising a pair of radiation, preferably ultraviolet radiation, lamps 145 disposed within a protective sleeve 150—e.g., a quartz sleeve.

Disposed adjacent cover plate 135 is a cleaning apparatus 200. Cleaning apparatus 200 comprises a pair of rods 205,210 which are slidably moveable through cover plate 135. Attached to the ends of rods 205,210 is a cleaning sleeve 300, the details of which will be described below. Attached to the other ends of rods 205,210 is a plate 215 which is connected to a slide 219 movable along a rail 220. Rail 220 is a conventional electric screw drive which is connected to an electric motor (not shown) or other electric motive means. The electric motor serves to rotate the screw (not shown) which translates slide 219 along rail 220 thereby moving plate 215.

Figure 4:
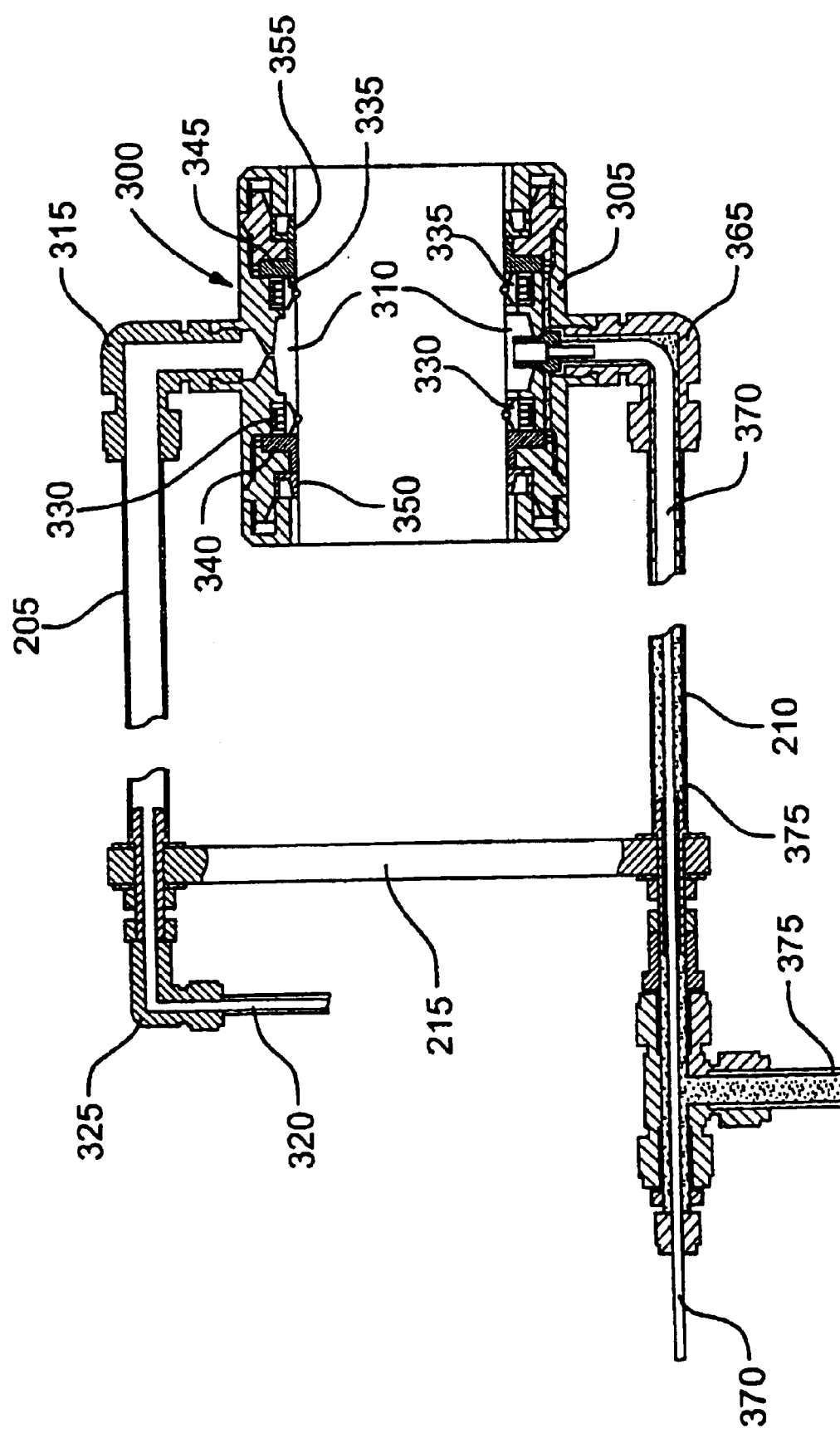
FIGS. 4 and 5 illustrate enlarged side elevations, cross-section of the cleaning apparatus illustrated in FIGS. 2 and 3, respectively.
Figure 5:
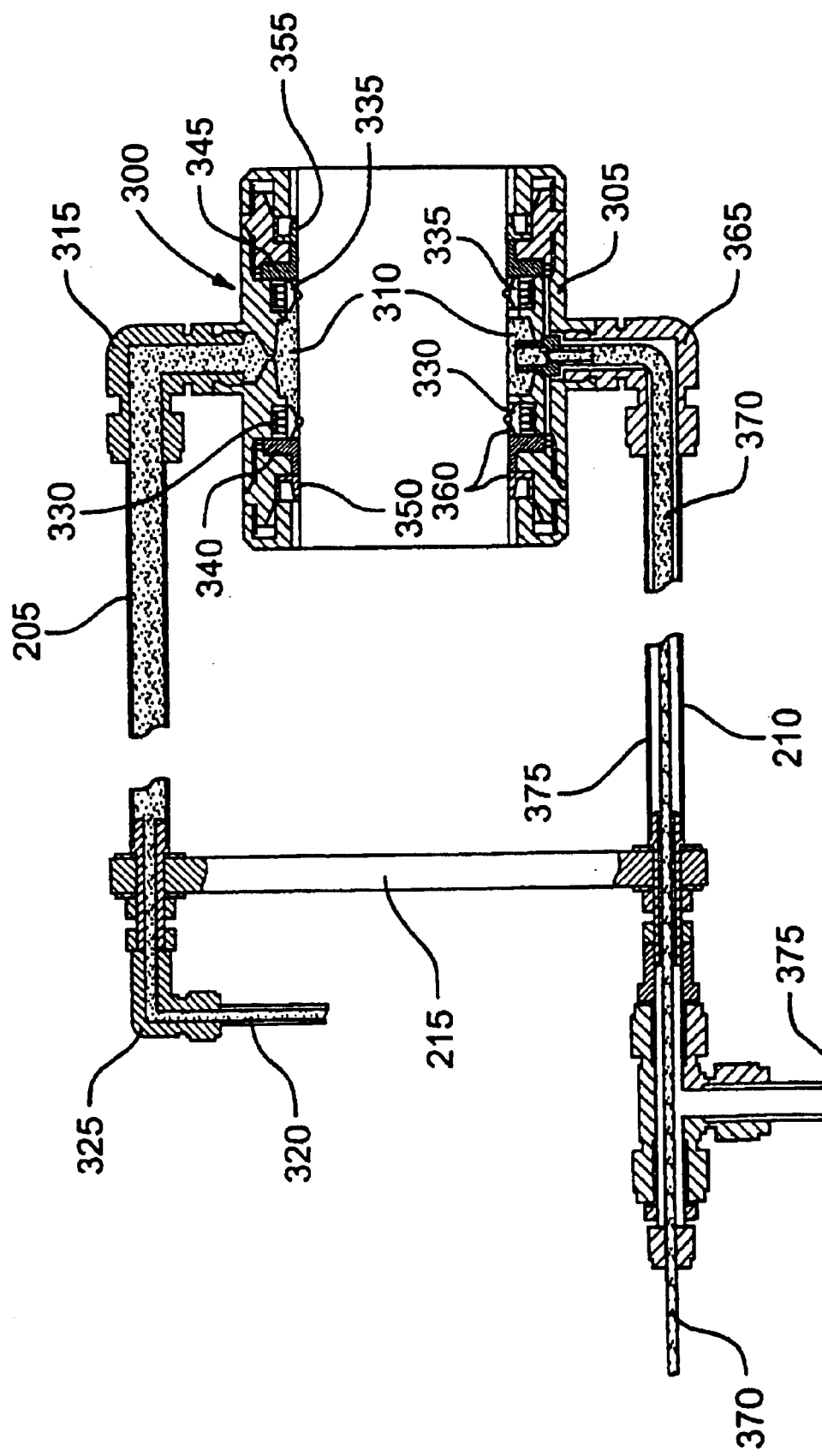
Figure 6:
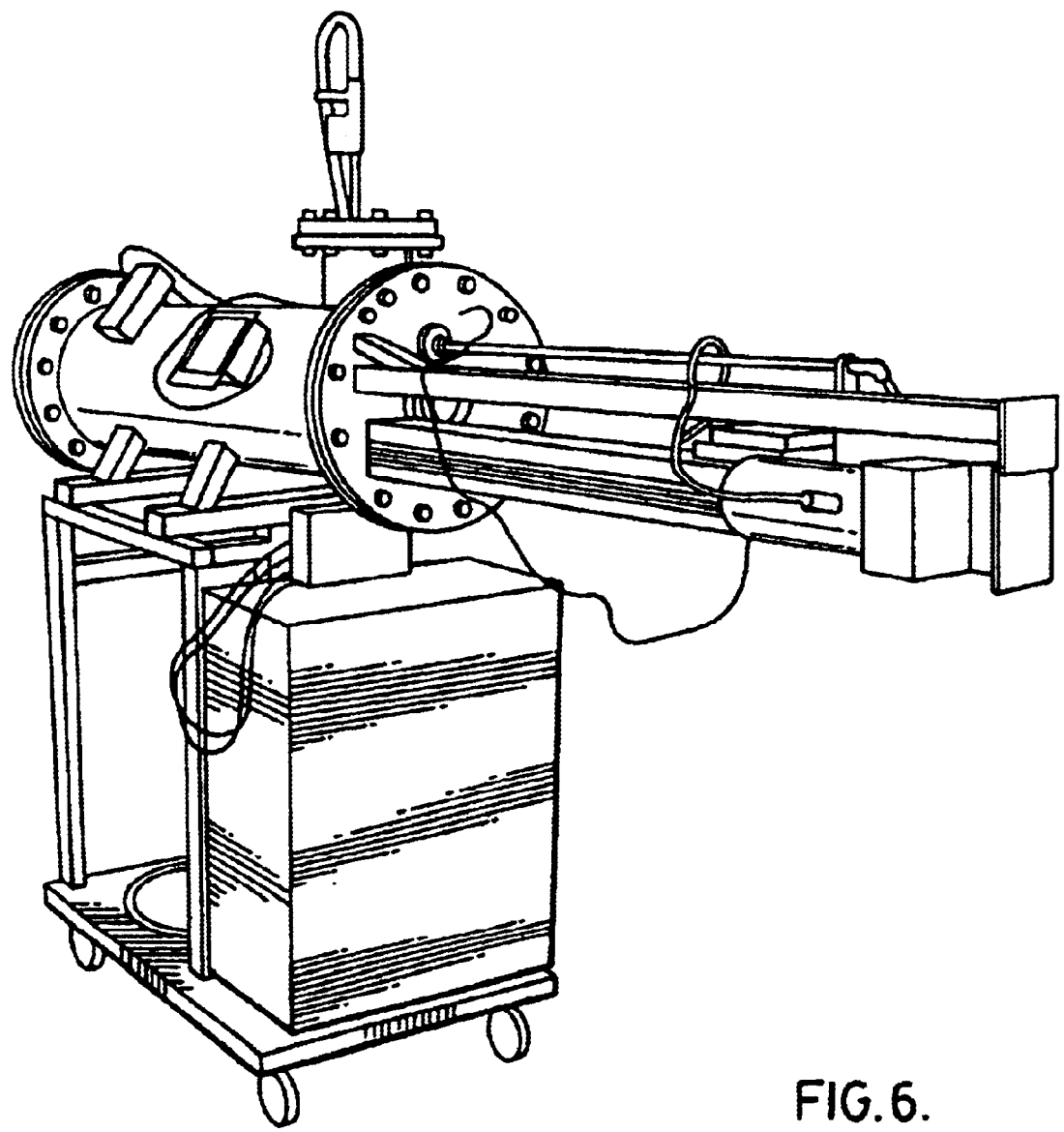
FIGS. 6–8 illustrate photographs of a particularly preferred embodiment of the present invention.
Figure 7:
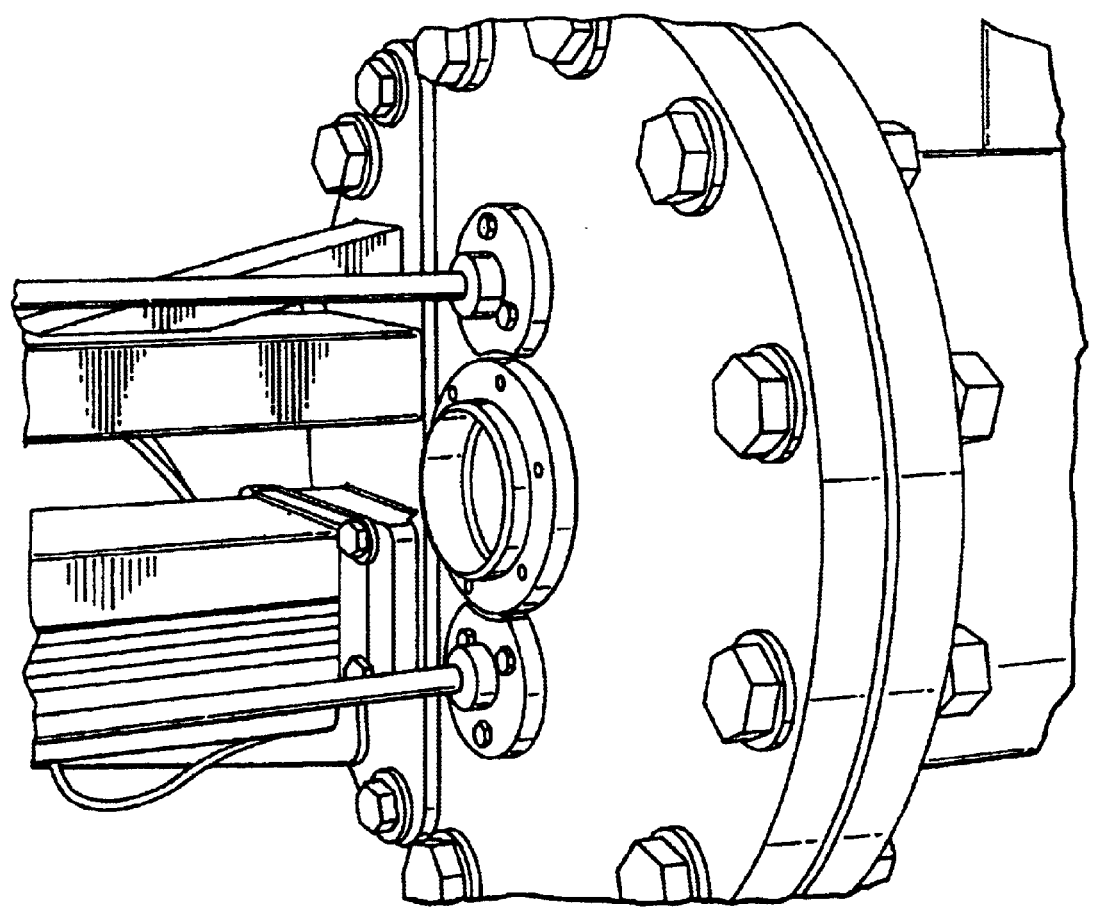
Figure 8:
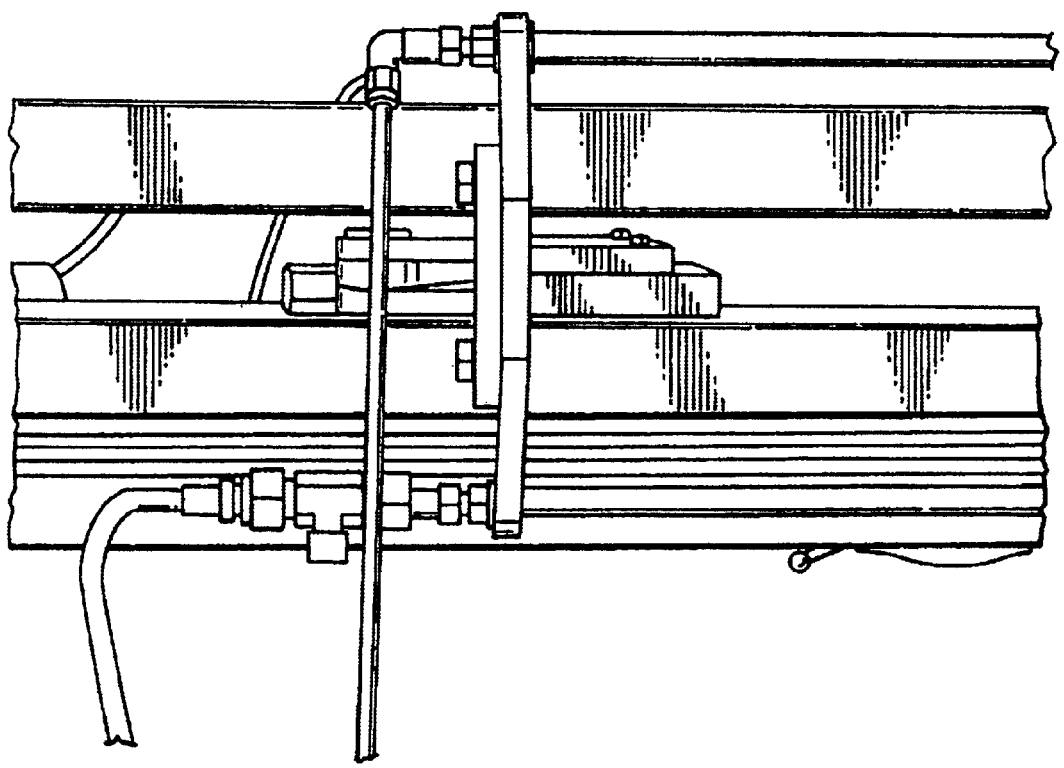

With reference to FIGS. 4 and 5, a more detailed explanation of the design of cleaning sleeve 300 will be provided. Thus, cleaning sleeve 300 comprises a sleeve element 305 which surrounds and is movable over protective sleeve 150 of radiation source assembly 140 (see FIGS. 2 and 3). Sleeve element 305 includes a chamber 310 for receiving a cleaning fluid in FIG. 5, the cleaning fluid is shown in solid black. Cleaning chamber 310 is coupled to an elbow connector 315 which in turn is coupled to rod 205 and, ultimately, plate 215. A line 320 is connected to plate 215 and in turn to rod 205 via an elbow connector 325. The other end of line 320 is connected to a supply of cleaning fluid (not shown). The cleaning fluid may be acetic acid or any other suitable fluid which will facilitate removal of fouling materials (e.g., minerals, algae and the like) from the surface of protective sleeve 150. In essence, cleaning chamber 310 is defined by a pair of seals 330,335 which, when sleeve 300 is mounted on quartz sleeve 150, form a substantially fluid-tight type seal. Seals 330,335 are annular seals which surround quartz sleeve 150. Substantially adjacent seals 330,335 are a pair of Teflon™ bearings 340,345, respectively.

Adjacent Teflon™ bearing 340,345 are a pair of second seals 350,355, respectively.

With reference to FIG. 4, in essence, Teflon™ bearings 340,345 are disposed in a chamber 360 defined between seals 330,335 and 350,355, respectively. This can be seen clearly in FIG. 4 which illustrates a flow of fluid in black from second chamber 360.

Opposite elbow connection 315 attached to sleeve element 305 is another elbow element 365 which is connected to rod 210 and in turn to plate 215.

As will be apparent, rod 210 includes a coaxial line which serves two purposes. First, with reference to FIG. 5, cleaning fluid (shown in black) may be removed from cleaning chamber 310 via an internal lin 370 in rod 210. The disposition of line 370 in this manner creates a second line 375 coaxially disposed around line 370. The function of line 375 is illustrated in FIG. 4 and served to remove fluid from second chamber 360. Thus, rod 210 serves to both remove cleaning solution from chamber 310 and independently remove fluid from second chamber 360.

Preferably lines 320 and 370 are connected to a recirculation pump which allows for cleaning solution to be recirculate through clearing sleeve 300 as illustrated in FIG. 5 (the cleaning solution is shown in black. Recirculation can be continuous or on a periodic basis. It should by apparent that the cleaning solution may be circulated in the reverse direction to that described above.

In operation, when it is desired to clean the exterior of protective sleeve 150, the electrically driven screw (not shown) in rail 220 is actuated thereby moving plate 215 with respect to rail 220. This results in movement of cleaning sleeve 300 over protective sleeve 150. Such cleaning can be done while fluid treatment device 100 is in operation or while it has been shut down for maintenance or another reason. Further, it is possible to design the dimensions of housing 115 such that cleaning sleeve 300 may be parked in a position in housing 115 such that it does not interfere with the hydraulic flow of fluid through the device. As will be apparent to those of skill in the art. FIG. 2 shows clearing sleeve in the filly extended (i.e, into housing 115) position whereas FIG. 3 illustrates cleaning sleeve in a retracted position While the present invention has been described with reference to preferred and specifically illustrated embodiments, it will ofcourse be understood by those of skill in the arts that various modifications to these preferred and illustrated embodiments may be made without the parting from the spirit and scope of the invention.

All publications, patents and patent applications referred to herein are incorporated by reference in their entirety to the same extent as if each individual publication, patent or patent application was specifically and individually indicated to be incorporated by reference in its entirety.

What is claimed is:

1. A cleaning apparatus for use in a fluid treatment system comprising a radiation source assembly, the cleaning apparatus comprising:

at least one cleaning sleeve in sliding engagement with the exterior of the radiation source assembly;

a first chamber disposed in the at least one cleaning sleeve in contact with a portion of the exterior of the radiation source assembly and for being supplied with a cleaning solution;

a pair of annular second chambers on opposed sides of the first chamber and substantially surrounding the exterior of the radiation source assembly;

seal means to restrict movement of fluid between the first chamber and each second chamber; and drive means to translate the at least one cleaning sleeve along the exterior of the radiation source assembly.

2. The cleaning apparatus defined in claim 1, further comprising first drain means to withdraw fluid from the second chamber.

3. The cleaning apparatus defined in claim 1, further comprising second drain means to withdraw cleaning fluid from the first chamber.

4. The cleaning apparatus defined in claim 1, further comprising supply means to supply cleaning fluid to the first chamber.

5. The cleaning apparatus defined in claim 1, wherein the first chamber comprises a first annular chamber substantially surrounding the exterior of the radiation source assembly.

6. The cleaning apparatus defined in claim 1, wherein the pair of annular second chambers are in communication with one another.

7. The cleaning apparatus defined in claim 1, wherein the seal means defines a barrier between the first chamber and the second chamber.

8. The cleaning apparatus defined in claims 1, further comprising second seal means disposed between the at least one cleaning sleeve and the exterior of the radiation source assembly.

9. The cleaning apparatus defined in claim 1, wherein the radiation source assembly comprises at least one radiation source disposed in a protective sleeve.

10. The cleaning apparatus defined in claim 1, wherein the protective sleeve comprises a quartz sleeve.

11. A fluid treatment device comprising a housing for receiving a flow of fluid, the housing comprising:
  a fluid inlet;
  a fluid outlet;
  a fluid treatment zone disposed between the fluid inlet and the fluid outlet;
  a radiation source assembly disposed in the fluid treatment zone for treatment of the flow of fluid; and
  a cleaning apparatus comprising: at least one cleaning sleeve in sliding engagement with the exterior of the radiation source assembly; a first chamber disposed in the at least one cleaning sleeve in contact with a portion of the exterior of the radiation source assembly and for being supplied with a cleaning solution; a second chamber disposed in the at least one cleaning sleeve adjacent the first chamber; seal means to prevent substantially unrestricted movement of fluid between the first chamber and the second chamber; first drain means to withdraw fluid from the second chamber; and drive means to translate the at least one cleaning sleeve along the exterior of the radiation source assembly.

12. The fluid treatment device defined in claim 11, wherein the cleaning apparatus further comprises first drain means to withdraw fluid from the second chamber.

13. The fluid treatment device defined in claims 11, wherein the cleaning apparatus further comprises second drain means to withdraw cleaning fluid from the first chamber.

14. The fluid treatment device defined in claim 11, wherein the cleaning apparatus further comprises supply means to supply cleaning fluid to the first chamber.

15. The fluid treatment device defined in claim 11, wherein the first chamber comprises a first annular chamber substantially surrounding the exterior of the radiation source assembly.

16. The fluid treatment device defined in claim 11, wherein the second chamber comprises a pair of second annular chambers on opposed sides of the first chamber and substantially surround the exterior of the radiation source assembly.

17. The fluid treatment device defined in claim 11, wherein the pair of second annular chambers are in communication with one another.

18. The fluid treatment device defined in claim 11, wherein the seal means defines a barrier between the first chamber and the second chamber.

19. The fluid treatment device defined in claim 11, wherein the cleaning apparatus further comprises second seal means disposed between the at least one cleaning sleeve and the exterior of the radiation source assembly.

20. The fluid treatment device defined in claim 11, wherein the protective sleeve comprises a quartz sleeve.

21. The fluid treatment device defined in claim 11, wherein the fluid treatment zone comprises a substantially elongate irradiation zone.

22. The fluid treatment device defined in claim 11, wherein the radiation source assembly comprises at least one radiation source disposed in a protective sleeve.

23. The fluid treatment device defined in claim 11, wherein the at least one radiation source is substantially elongate.

24. The fluid treatment device defined in claim 11, wherein the at least one radiation source is disposed substantially parallel to a flow of fluid through the irradiation zone.

25. The fluid treatment device defined in claim 11, wherein the at least one radiation source is disposed substantially transverse to a flow of fluid through the irradiation zone.

26. The fluid treatment device defined in claim 11, wherein the fluid inlet, the fluid outlet and the fluid treatment zone are arranged in a substantially collinear manner.

27. The fluid treatment device defined in claim 11, wherein the fluid inlet, the fluid outlet and the fluid treatment zone have substantially the same cross-section.

28. The fluid treatment device defined in claim 11, wherein the fluid inlet, the fluid outlet and the fluid treatment zone are arranged in a substantially non-collinear manner.

* * * * *